United States Patent
Giri et al.

(10) Patent No.: US 11,179,720 B2
(45) Date of Patent: Nov. 23, 2021

(54) MICROFLUIDIC CHIPS

(71) Applicant: Hewlett-Packard Development Company, L.P., Spring, TX (US)

(72) Inventors: Manish Giri, Corvallis, OR (US); Chantelle Domingue, Corvallis, OR (US); Tod Woodford, Corvallis, OR (US); Matthew David Smith, Corvallis, OR (US); Rachel M. White, Corvallis, OR (US); Joshua M. Yu, Corvallis, OR (US); Hilary Ely, Corvallis, OR (US); Jeremy Sells, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 44 days.

(21) Appl. No.: 16/319,702

(22) PCT Filed: Oct. 7, 2016

(86) PCT No.: PCT/US2016/056087
§ 371 (c)(1),
(2) Date: Jan. 22, 2019

(87) PCT Pub. No.: WO2018/067177
PCT Pub. Date: Apr. 12, 2018

(65) Prior Publication Data
US 2020/0139366 A1    May 7, 2020

(51) Int. Cl.
*B01L 3/00* (2006.01)
*F16K 99/00* (2006.01)

(52) U.S. Cl.
CPC . *B01L 3/502738* (2013.01); *B01L 2300/0627* (2013.01); *B01L 2300/12* (2013.01); *B01L 2300/1805* (2013.01); *B01L 2400/046* (2013.01); *B01L 2400/0688* (2013.01); *F16K 99/0019* (2013.01)

(58) Field of Classification Search
None
See application file for complete search history.

(56) References Cited

U.S. PATENT DOCUMENTS

| 5,992,820 A | 11/1999 | Fare et al. |
| 7,611,673 B2 | 11/2009 | Kartalov et al. |
| (Continued) | | |

FOREIGN PATENT DOCUMENTS

| UA | 60060 | 6/2011 | |
| WO | WO-2012003711 A1 * | 1/2012 | ......... F16K 99/0044 |
| WO | 2016003278 | 1/2016 | |

OTHER PUBLICATIONS

C. Garcia, et al. "B3. 3-Fabrication of Microfluidic Devices Using SU-8 for Detection and Analysis of Viruses", Proceedings Sensor 2009, vol. I, p. 193-7, May 2009.*

(Continued)

*Primary Examiner* — J. Christopher Ball
(74) *Attorney, Agent, or Firm* — Thorpe North & Western LLP

(57) ABSTRACT

The present disclosure is drawn to microfluidic chips. The microfluidic chips can include an inflexible material having an elastic modulus of 0.1 gigapascals (GPa) to 450 GPa. A microfluidic channel can be formed within the inflexible material and can connect an inlet and an outlet. A working electrode can be associated with the microfluidic channel and can have a surface area of 1 $\mu m^2$ to 60,000 $\mu m^2$ within the microfluidic channel. A bubble support structure can also be formed within the microfluidic channel such that the working electrode is positioned to electrolytically generate a bubble that becomes associated with the bubble support structure.

17 Claims, 2 Drawing Sheets

(56) References Cited

U.S. PATENT DOCUMENTS

| | | | |
|---|---|---|---|
| 7,976,286 B2 | 7/2011 | Kim et al. | |
| 8,037,903 B2 | 10/2011 | Wang et al. | |
| 2003/0150716 A1* | 8/2003 | Hua | F16K 99/0019 |
| | | | 204/232 |
| 2005/0217743 A1* | 10/2005 | Bohm | A61B 5/150221 |
| | | | 137/828 |
| 2005/0266582 A1 | 12/2005 | Modlin et al. | |
| 2009/0215194 A1* | 8/2009 | Magni | B01L 3/502707 |
| | | | 436/174 |
| 2010/0163412 A1 | 7/2010 | Attinger et al. | |

OTHER PUBLICATIONS

S. Z. Hua, et al. "Microfluidic Actuation Using Electrochemically Generated Bubbles", Analytical Chemistry, 74(24): p. 6392-6396, Dec. 2002.*

Hess "Laser diagnostics of mechanical and elastic properties of silicon and carbon films", Applied Surface Science, 106, p. 429-437; Oct. 1996.*

Hua et al., Electrochemically Actuated Microvalves for Microfluidic Systems, ASME International Mechanical Engineering Congress & Exposition, 2002, 6 pages.

Khoshmanesh et al., A multi-functional bubble-based microfluidic system, Scientific Reports 5, Article No. 9942, 2015, 31 pages.

Papavasiliou et al., High-Speed and Bi-Stable Electrolysis-Bubble Actuated Gate Valves, Transducers'01 Eurosensors XV, The 11th International Conference on Solid-State Sensors and Actuators, 2001, 4 pages.

Papavasiliou et al., Electrolysis-Bubble Actuated Gate Valve, https://lms.i-know.com/mod/resource/view.php?id=569&lang=it.

International Search Report dated Jun. 8, 2017 for PCT/US2016/056087, Applicant Hewlett-Packard Development Company, L.P.

* cited by examiner

MICROFLUIDIC CHIPS

BACKGROUND

Microfluidics involves the flow of relatively small volumes of fluid within micrometer-sized channels or smaller. Microfluidic systems have many diverse applications in areas such as biological assays, drug screening, fuel cells, etc. However, the microfluidic behavior of a fluid can differ from the macrofluidic behavior of a fluid. For example, fluid properties such as surface tension and fluidic resistance can play a more dominant role in the microfluidic behavior of fluids than they do on the macroscopic level. Thus, the ability to effectively manipulate fluids in a microfluidics system can expand the number of areas and ways in which these systems can be used.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1:
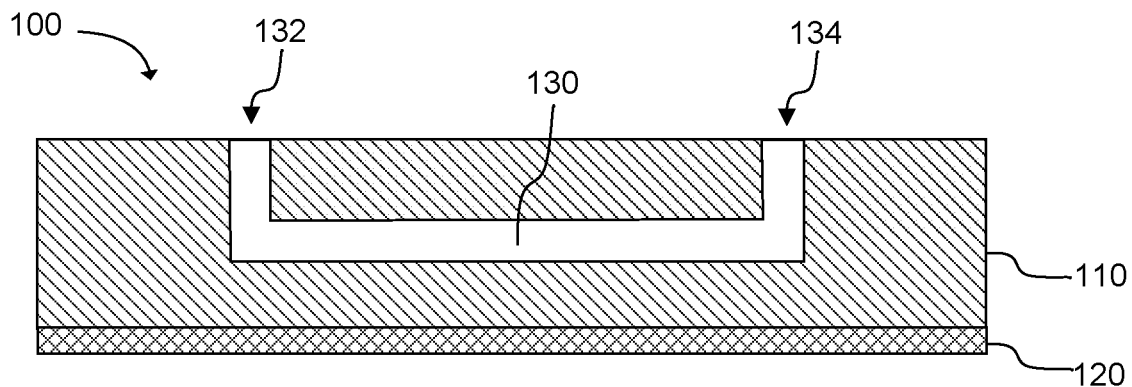
FIG. 1 is a cross-sectional view of an example microfluidic chip in accordance with the present disclosure.

Reference will now be made to several examples that are illustrated herein, and specific language will be used herein to describe the same. It will nevertheless be understood that no limitation of the scope of the disclosure is thereby intended.

DETAILED DESCRIPTION

Microfluidic chips can be used for a variety of applications, including biotechnology, drug screening, therapeutic delivery, fuel cells, etc. However, the use of valves to manipulate fluid flow within microfluidic networks can be challenging. Many valves use flexible materials and/or mechanically actuating parts that are susceptible to failure over the lifetime of the chip.

The present technology sets forth a microfluidic chip that uses a bubble valve to overcome a number of challenges associated with more traditional valves made of flexible materials and/or mechanically actuating parts. More specifically, the microfluidic chip can include an inflexible material having an elastic modulus of 0.1 gigapascals (GPa) to 450 GPa. A microfluidic channel can be formed within the inflexible material and can connect an inlet and an outlet. A working electrode can be associated with the microfluidic channel and can have a surface area of 1 $\mu m^2$ to 60,000 $\mu m^2$ within the microfluidic channel. Further, a bubble support structure can be formed within the microfluidic channel such that the working electrode is positioned to electrolytically generate a bubble that becomes associated with the bubble support structure.

In some examples, the microfluidic chip can also include a substrate that supports the inflexible material. The substrate can include silicon, glass, sapphire, carbide, ceramic, or a combination thereof. In some examples, the inflexible material can include SU-8, glass, molded plastics, epoxy molding compounds (EMCs), and combinations thereof. In some additional examples, the inflexible material can have an elastic modulus of 1 GPa to 10 GPa. Further, in some examples, the inlet and outlet can be formed in two different surfaces of the inflexible material. In some further examples, the working electrode can include gold, silver, platinum, tantalum, aluminum, titanium, copper, tungsten, silicon, alloys thereof, or a combination thereof. In some examples, the working electrode can have a surface area within the microfluidic channel of 60 $\mu m^2$ to 600 $\mu m^2$. In some examples, the bubble support structure can include a recess formed in a wall of the microfluidics channel.

In some examples, the microfluidic chip can be used in a method of separating volumes of liquid within a microfluidic channel. The method can include loading an aqueous fluid into the microfluidic channel of the microfluidic chip and applying a voltage to the working electrode. The voltage applied to the working electrode can electrolytically generate a bubble from the aqueous fluid of sufficient size to separate liquid within the microfluidic channel into a plurality of volumes. The bubble support structure can support the bubble at a predetermined position within the microfluidic channel.

In some examples, loading can be performed via a thermal inkjet pump, micro pipetting, micro droplet delivery, capillary flow, or a combination thereof. In some examples, the bubble is expandable and contractible to form a bubble valve for blocking and unblocking the microfluidic channel, respectively. In some examples, the voltage applied can be from 0.1 volts to 10 volts.

Further, in some examples, the microfluidic chip can be part of a microfluidic chip system that can include a power supply operatively connected to the working electrode. In some examples, the power supply can be a direct current (DC) power supply. In some examples, the system can also be operatively associated with a heater. In some additional examples, the system can also be operatively associated with a sensor.

Thus, the microfluidic chip described herein can be used in a variety of methods and systems for a variety of applications. As such, the microfluidic chip can be manufactured with a number of design considerations. For example, the microfluidic chip or system can include an aqueous fluid loaded therein. Examples of such aqueous fluids include water, or aqueous electrolytic solutions. Turning to the structure, one representative example of a microfluidic chip is illustrated in FIG. 1. As illustrated in FIG. 1, a microfluidic channel 130 can be formed within an inflexible material 110 of microfluidic chip 100. The microfluidic channel can connect an inlet 132 and an outlet 134. In this particular example, the inflexible material is attached or bonded to a substrate 120. In this example, the inlet and the outlet are in the same surface, but could be in different surfaces, including adjacent surfaces or opposing surfaces, for example. It is noted that FIG. 1 is a simplified example of a microfluidic chip provided for illustrative purposes only and is not intended to be limiting.

The inflexible material 110 can include or be made of a variety of materials. More specifically, by "inflexible material," it is meant that the material can have a specific elastic modulus. For example, in some cases, the inflexible material can have an elastic modulus of from 0.1 GPa to 450 GPa. In some other examples, the inflexible material can have an elastic modulus of from 0.5 GPa to 50 GPa, or from 1 GPa to 10 GPa. Thus, any suitable material having the specified elastic modulus can be used. Non-limiting examples of suitable inflexible materials can include SU-8, glass, molded plastics, EMCs, or a combination thereof.

An inflexible material can have a number of advantages. For example, flexible materials can require significant support infrastructure, can be difficult to manufacture on a large scale, and can degrade or otherwise fail over a relatively short period of time and/or after multiple uses. In contrast, in some examples, an inflexible material can be structurally sound without additional support infrastructure, can be more easily manufactured on a large scale, and can be more resilient to degradation and other failure mechanisms over the lifetime of the chip. As such, an inflexible material can provide a suitable body or structure in which a microfluidic channel can be formed.

A number of methods can be used to form the microfluidic channel in the inflexible body. For example, the microfluidic channel can be formed via molding, etching, machining, contact lithography, photolithography, the like, or a combination thereof. Further, any suitable number of microfluidic channels can be formed in the inflexible material. In some examples, some or all of the channels can be discrete channels. In some examples, some or all of the channels can be interconnected channels (i.e. interconnected with one another).

The channels can have any suitable diameter or range of diameters. Generally, the microfluidic channel, or a portion thereof, can have a diameter ranging from 0.1 µm to 1000 µm, or from 1 µm to 500 µm.

The microfluidic channel can connect an inlet and an outlet of the microfluidic chip. Generally, the inlet and/or outlet can be formed on any combination of surfaces of the microfluidic chip. For example, the inlet and outlet can be formed on the same surface or different surfaces. In some specific examples, the inlet and outlet can be formed on the same surface of the inflexible material. In other examples, the inlet and outlet can be formed on different surfaces of the inflexible material. In yet other examples, the inlet and outlet can be formed on the same surface of a substrate to which the inflexible material is attached or bonded. In other examples, an inlet and/or outlet can be formed on a surface of the inflexible material and an inlet and/or outlet can be formed on a surface of the substrate.

In some examples, the microfluidic chip can include the same number of inlets as outlets. In other examples, the microfluidic chip can include a different number of inlets as compared to the number of outlets. In other specific examples, the microfluidic chip can include more inlets than outlets. This can be advantageous for a number of applications, such as when two or more fluids or samples are desired to be loaded through different inlets and subsequently combined and mixed within a single microfluidic channel of the microfluidic chip for a particular biological assay or screening. In yet other examples, there can be more outlets than inlets. This can also be advantageous for a number of applications, such as when it is desirable to load a small number of fluids or samples into the microfluidic chip to be subsequently split and mixed within the microfluidic chip in a large number of proportional ratios for screening or other testing.

When combining or splitting microfluidics channels, a valve system can be valuable to selectively manipulate fluids along specific microfluidic pathways. However, a number of valves are dependent on moving parts and/or flexible materials that are subject to failure over time. In contrast, the valve system described herein is not dependent on moving parts, but can be generated electrochemically on demand.

Figure 2A:
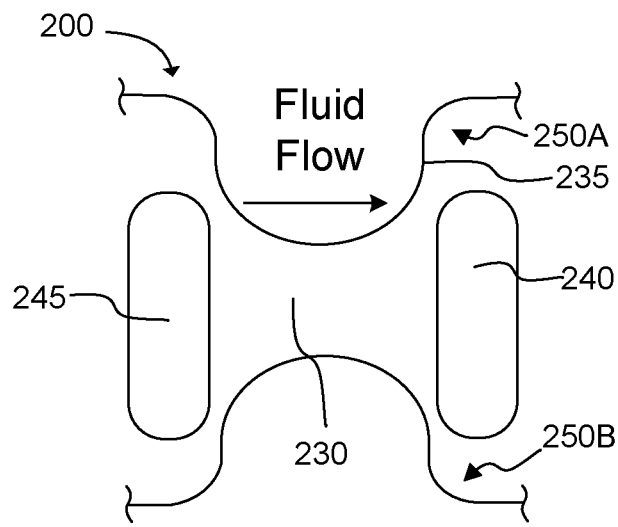
FIG. 2A is a plan view of an example microfluidic channel in accordance with the present disclosure.
Figure 2B:
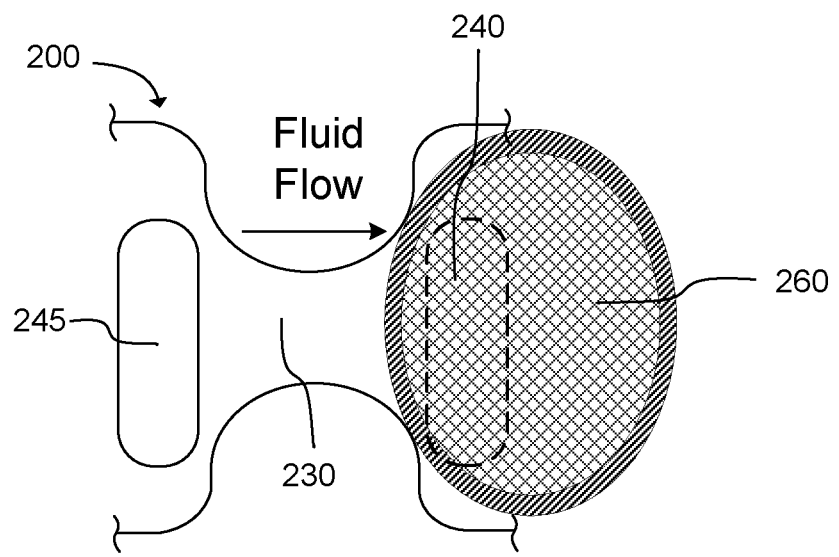
FIG. 2B is a plan view of the microfluidic channel of FIG. 2A that includes a bubble valve in accordance with the present disclosure.

FIGS. 2A and 2B provide a representative example of how the present valve system can work. As illustrated in FIG. 2A, a microfluidic chip 200 can include a microfluidic channel 230 having an interior wall 235. A working electrode 240 can be associated with the microfluidic channel to contact an electrolytic fluid or solution within the microfluidic channel. A ground or return electrode 245 can also be associated with the microfluidic channel to contact the electrolytic fluid or solution within the microfluidic channel. In some examples, the working electrode can have a surface area within the microfluidic channel of 1 $\mu m^2$ to 60,000 $\mu m^2$. In other examples, the working electrode can have a surface area within the microfluidic channel of 60 $\mu m^2$ to 600 $\mu m^2$. The ground or return electrode can also have a surface area within the microfluidic channel of 1 $\mu m^2$ to 60,000 $\mu m^2$, or 60 $\mu m^2$ to 600 $\mu m^2$.

It is noted that while FIGS. 2A and 2B only illustrate a working electrode and a ground electrode, this is not intended to be limiting. For example, a single working electrode can also be used in connection with a universal ground plane disposed throughout the microfluidic channel, or a portion thereof. In yet other examples, an electrode trio can also be used, such as a working electrode, ground electrode, and reference electrode. Thus, any suitable combination of electrodes can be used.

The positioning and orientation of the electrodes can be dependent on a particular application for which the microfluidic channel is intended to be used. Thus, the electrode(s) can be positioned and/or oriented in any suitable manner for a predetermined application. For example, in some cases, the electrodes can be oriented parallel to one another, can be interdigitated, can be concentric circle electrodes, or otherwise oriented. Further, the electrodes, or portions thereof, can be coplanar, non-coplanar, or a combination thereof. The working and/or ground electrodes can be made of any suitable material. In some examples, the working and/or ground electrodes can include or be made of gold, silver, platinum, tantalum, aluminum, titanium, copper, tungsten, silicon, alloys thereof, the like, or a combination thereof. In some examples, the electrodes can include a stack of different metals, such as a tantalum layer covered by a gold layer, for example.

In some examples, the working and/or ground electrode can be formed on a substrate that is bonded or otherwise attached to the inflexible material (e.g. substrate 120 illustrated in FIG. 1, for example). The substrate can include or be made of silicon, glass, sapphire, carbide, ceramic, the like, or a combination thereof. In some examples, the substrate can form a portion of the microfluidic channel, such as a wall or wall segment of the microfluidic channel. In some examples, the working and/or ground electrode can also form a part of a wall or wall segment of the microfluidic channel.

Returning again to FIGS. 2A and 2B, a bubble support structure or bubble trap, such as recesses 250A and 250B, can be formed or disposed within microfluidic channel 230. The bubble support structure can support an electrolytically generated bubble at a predetermined position within the microfluidic channel. Accordingly, the working electrode can be positioned to electrolytically generate a bubble 260 that becomes associated with the bubble support structure. The bubble support structure can help prevent the bubble from migrating along the microfluidic channel and obstructing fluid flow in undesired areas of the microfluidic channel.

A variety of bubble support structures or bubble traps can be used. For example, the bubble support structure can include a recess formed in a wall (i.e. sidewall, ceiling, floor, or combination thereof) of the microfluidic channel, a protrusion formed along a wall (e.g., sidewall, ceiling, floor, or combination thereof) of the microfluidic channel, a narrowing of the microfluidic channel, a plurality of support surfaces formed within the microfluidic channel (e.g., pillars, posts, crosspieces, for example), the like, or a combination thereof. In one specific example, the bubble support structure can include a recess formed in a wall of the microfluidic channel, as illustrated in FIGS. 2A and 2B. In another specific example, the bubble support structure can include a narrowing of the microfluidic channel. This can also be illustrated with reference to FIGS. 2A and 2B, but where the direction of fluid flow is reversed, or alternatively where the working electrode is electrode 245 and the ground or return electrode is electrode 240 and the bubble is formed at electrode 245 instead of electrode 240.

The microfluidic chip can also be part of a microfluidic chip system that also includes a power supply operatively connected to the working electrode. Any suitable power supply can be used. In some examples, the power supply can be a direct current (DC) power supply. In some other examples, the power supply can be an alternating current (AC) to DC power supply that can convert an AC voltage to a DC voltage.

In some examples, the system can also include an aqueous fluid. In some examples, aqueous fluid can be pre-loaded within the microfluidic channel of the microfluidic chip. In other examples, aqueous fluid is not pre-loaded within the microfluidic channel.

It is noted that the term "aqueous fluid(s)" refers to any fluid that includes water, including water per se, or aqueous electrolytic solutions (also referred to as "electrolytic solutions"). Thus, in examples where electrolytic solutions are described, this fluid may be substituted with water in some examples and vice versa.

In accordance with this, any suitable aqueous fluid or combination of aqueous fluids can be used. In some examples, the aqueous fluid can be water, such as filtered water, distilled water, deionized water, the like, or combinations thereof, for example. In these examples, the water molecule itself can undergo the electrolysis. In other examples, the aqueous fluid can be an electrolytic solution. The electrolytic solution can include a variety of suitable electrolytes. Thus, the water molecules and/or the electrolytes can be impacted by the electrolysis. Non-limiting examples of electrolytes can include sodium ion, potassium ion, calcium ion, magnesium ion, chloride ion, sulfate ion, phosphate ion, carbonate ion, the like, or a combination thereof. Thus, in some examples, the aqueous fluid can include water or another aqueous vehicle containing sodium ion, potassium ion, calcium ion, magnesium ion, chloride ion, sulfate ion, phosphate ion, carbonate ion, the like, or a combination thereof.

Additionally, in some examples, the microfluidic chip and/or microfluidic chip system can be operatively associated with a heater to help control the temperature of the aqueous fluid and any associated sample solutions loaded into the microfluidic chip. Further, in some examples, the microfluidic chip or microfluidic chip system can be operatively associated with a sensor, such as a biosensor, to detect an analyte within or ejected from the microfluidic chip.

The microfluidic chip and/or microfluidic chip system can also be used in a method of separating volumes of liquid or fluid within a microfluidic channel. The method can include loading an aqueous fluid or combination of aqueous fluids into a microfluidic channel of a microfluidic chip. The aqueous fluid, sample solution, or combinations thereof can be loaded into the microfluidic channel using any suitable method. For example, loading can be performed via a thermal inkjet pump, micro pipetting, micro droplet delivery, capillary action, the like, or a combination thereof. In one specific example, the aqueous fluid or sample solution can be loaded into the microfluidic channel via capillary action. In some examples, the aqueous fluid or sample solution can be loaded and/or subsequently manipulated in the microfluidic channel using a thermal inkjet pump.

In some examples, recirculating aqueous fluid and/or sample solutions within the microfluidic chip can be carried out. Recirculation of sample solutions can provide a number of advantages, such as shortening assay times, depositing greater sample sizes at a detection site, as well as other advantages. In some examples, a bubble valve, as described herein, can be used to control the recirculation of the aqueous fluid, such as the electrolytic solution and/or water sample solutions.

In some examples, these devices, methods and systems can be used for ejecting aqueous fluid or sample solutions from the microfluidic chip. The solutions can be ejected for a number of reasons. For example, the solutions can be ejected from the microfluidic chip to be collected for analysis. In other examples, the solutions can be ejected from the microfluidic chip to purge a particular solution from the chip and optionally load another solution into the chip. The solution can be a different solution or the same type of solution.

In other examples, these devices, methods, and systems can include applying a voltage to the working electrode to electrolytically generate a bubble from the aqueous fluid of sufficient size to stop fluid flow through the microfluidic channel and/or separate liquid within the microfluidic channel into a plurality of volumes. Thus, the bubble valve system can be used in a variety of ways. For example, the bubble can be expandable and contractible to form a bubble valve for blocking and unblocking the microfluidic channel, respectively. In another example, the bubble can be used to block fluid flow within the microfluidic channel to form discrete volumes of fluid on different sides of the bubble valve or about different sections or portions of the bubble valve. In one specific example, the bubble can be used as a valve to entrap fluid within a collection reservoir after the fluid has been pumped to the collection reservoir via the microfluidic channel.

Figure 3:
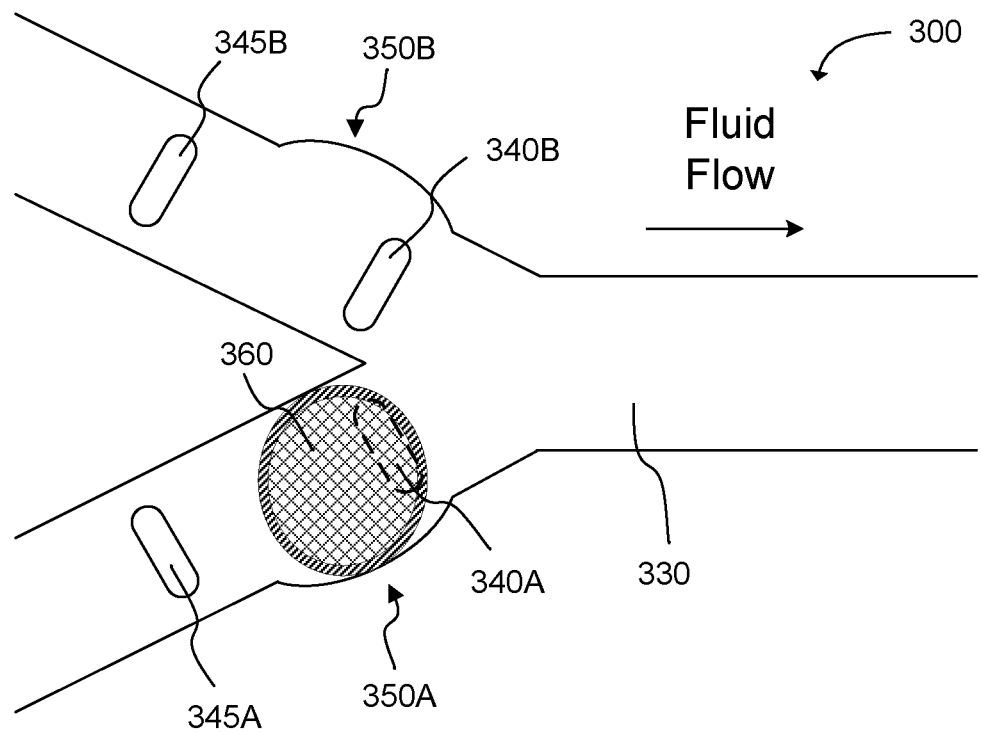
FIG. 3 is a plan view of another example of a microfluidic channel that includes a bubble valve, in accordance with the present disclosure.

In another example, as illustrated in FIG. 3, a microfluidic chip 300 can include a microfluidic channel 330 where fluid flows from a plurality of inlet channel segments into a single or combined channel segment. Each of the inlet channel segments can include a working electrode, such as electrodes 340A and 340B, and a ground or return electrode, such as electrodes 345A and 345B. Each of the working electrodes can be associated with a bubble support structure, such as recesses 350A and 350B. A voltage can be selectively applied to working electrodes in any of the inlet channel segments to electrolytically generate a bubble, such as bubble 360, to controllably block or reduce fluid flow through any one of the inlet channel segments to controllably meter fluid into the single or combined channel segment.

Figure 4:
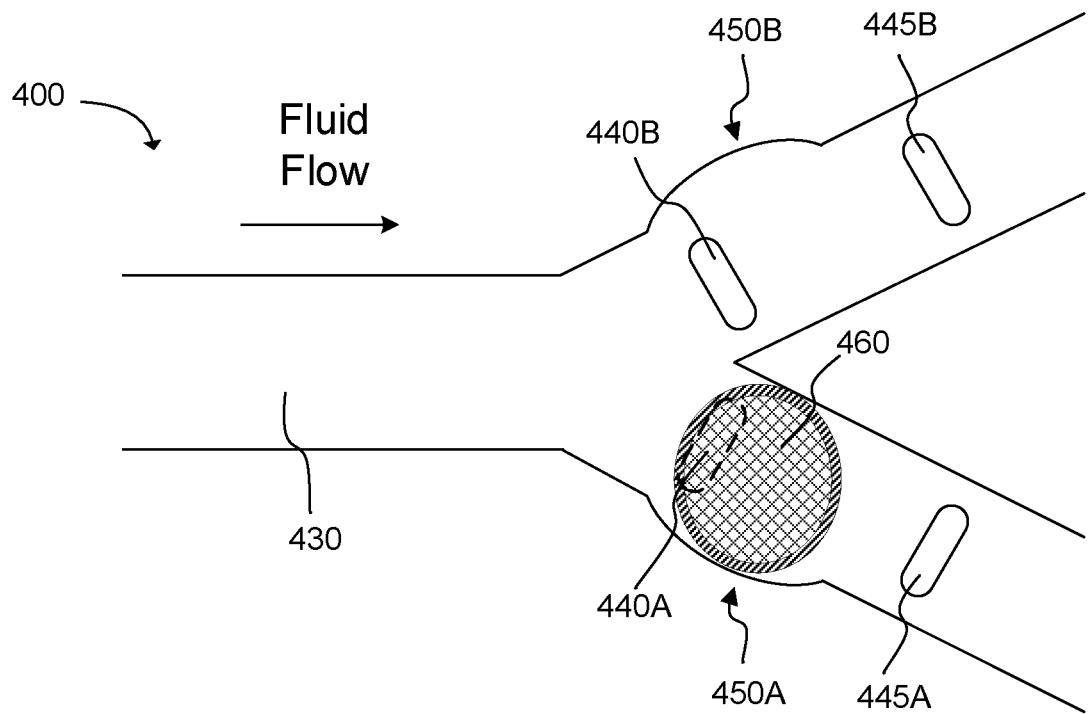
FIG. 4 is a plan view of an additional example of a microfluidic channel that includes a bubble valve in accordance with the present disclosure.

Alternatively, as illustrated in FIG. 4, microfluidic chip 400 can have a microfluidic channel 430 where fluid flows from a single channel segment to a plurality of outlet channel segments. Each of the outlet channel segments can include a working electrode, such as electrodes 440A and 440B, and a ground or return electrode, such as electrodes 445A and 445B. Each of the working electrodes can be associated with a bubble support structure, such as recesses 450A and 450B. A voltage can be selectively applied to working electrodes in any of the outlet channel segments to electrolytically generate a bubble, such as bubble 460, to controllably block fluid flow into or reduce fluid flow through any one of the outlet channel segments.

The bubble size and duration can be controlled using a number of factors such as amount of voltage applied to the working electrode, the pulse duration of the applied voltage, the surface area of the electrode in contact with the aqueous fluid, and the amount of electrolyte present in the aqueous fluid. For example, a direct current applied to the working electrode can cause current to pass through the aqueous fluid to the ground or return electrode to initiate electrolysis of an electrolyte in the aqueous fluid at the working (cathode) and/or ground electrode (anode). The voltage profile applied across the electrodes can be performed at various intensities and durations. Greater voltage levels applied to the working electrode can increase the rate of electrolysis and bubble formation. However, longer pulses of applied voltage can also increase the time for the bubble to decay and open up the bubble valve to fluid passage.

Thus, the amount and duration of voltage applied to the working electrode can vary according to the intended application of the bubble valve and the other properties of the microfluidics system. In some examples, the amount of voltage applied to the working electrode can range from 0.1 volts to 10 volts. In other examples, the voltage applied to the working electrode can range from 0.5 volts to 3.3 volts. Further, in some examples, the voltage can be applied at a pulse duration of from 10 milliseconds (ms) to 500 ms, or from 25 ms to 250 ms.

In addition to voltage application control, bubble stability can be also be affected and manipulated via a number of additional parameters. For example, bubble stability can also be affected by the composition of the aqueous fluid, the microfluidic channel design, local fluid temperature, liquid/gas diffusion properties, and the like. Bubble decay can also be affected these same parameters.

It is noted that, as used in this specification and the appended claims, the singular forms "a," "an," and "the" include plural referents unless the content clearly dictates otherwise.

"Substrate" includes any base material that can be coated in accordance with examples of the present disclosure, such as film base substrates, polymer substrates, conventional paper substrates, photobase substrates, offset media substrates, metal, glass, or the like. "Media substrate" includes substrates that are used as print media, and typically include more specific substrates, such as paper, polymer film, etc. Further, pre-coated and film coated substrates can be considered a "substrate" that can be likewise be coated in accordance with examples of the present disclosure.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the microfluidic chip, the method of separating volumes of fluid, and the microfluidic chip system, each of these discussions can be considered applicable to each of these examples, whether or not they are explicitly discussed in the context of that example. Thus, for example, in discussing details about the microfluidic chip perse, such discussion also refers to the method and the microfluidic chip system described herein, and vice versa.

The following illustrates an example of the disclosure. However, it is to be understood that this example is merely exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements.

EXAMPLE

A microfluidics chip was prepared by spin depositing SU8 onto a silicon wafer in a number of layers. All of the microfluidic channel features were prepared using photomasks to expose only predetermined regions of specific SU8 layers to light and allowing the masked regions to be removed. Electrodes were deposited and patterned on the silicon wafer prior to application of the SU8 material onto the silicon wafer.

After the microfluidic chip was formed, 10 µl of 154 mM PBS was loaded into a microfluidic channel using capillary action. A constant voltage of 2.5 volts was applied to the working electrode. Bubble formation was observed immediately upon voltage application. This voltage was maintained over a period of about 30 seconds to achieve and maintain a bubble diameter of approximately microns. The voltage was then adjusted to approximately 3.0 volts and the bubble diameter increased to approximately 60 microns, which was sufficiently large to completely block fluid flow through the microfluidic channel. Additionally, the working electrode was positioned such that the electrolytically formed bubble was supported within a recess of the microfluidic channel to maintain the bubble at a predetermined position within the microfluidic channel. The voltage bias was then removed and the bubble decayed according to gas diffusion properties for the electrolytic solution used. In this particular example, bubble stability was demonstrated for a minimum of 50 seconds.

What is claimed is:

1. A microfluidic chip, comprising:
   an inflexible material having an elastic modulus of 0.1 GPa to 450 GPa;
   a microfluidic channel formed within the inflexible material, said microfluidic channel connecting an inlet and an outlet;
   a working electrode associated with the microfluidic channel having a surface area of 1 µm² to 60,000 µm² within the microfluidic channel, wherein the working electrode includes gold; and
   a bubble support structure selected from a recess formed in a wall of the microfluidic channel, a protrusion formed along a wall of the microfluidic channel, a plurality of support surfaces formed within the microfluidic channel, or a combination thereof, wherein the working electrode is positioned and configured to electrolytically generate a bubble from an aqueous fluid, where the bubble becomes associated with the bubble support structure and forms a bubble valve operable to block and unblock the microfluidic channel.

2. The microfluidic chip of claim 1, further comprising a substrate which supports the inflexible material, said substrate comprising silicon, glass, sapphire, carbide, ceramic, or a combination thereof.

3. The microfluidic chip of claim 1, wherein the inflexible material comprises SU-8, molded plastics, epoxy molding compounds, or a combination thereof.

4. The microfluidic chip of claim 1, wherein the inflexible material has an elastic modulus of 1 GPa to 10 GPa.

5. The microfluidic chip of claim 1, wherein the inlet and outlet are formed in two different surfaces of the inflexible material.

6. The microfluidic chip of claim 1, wherein the working electrode comprises gold, silver, platinum, tantalum, aluminum, titanium, copper, tungsten, silicon, alloys thereof, or a combination thereof.

7. The microfluidic chip of claim 1, wherein the working electrode has a surface area within the microfluidic channel of 60 µm² to 600 µm².

8. The microfluidic chip of claim 1, wherein the working electrode is gold.

9. A method of separating volumes of liquid within a microfluidic channel, comprising:
   loading an aqueous fluid into the microfluidic channel of a microfluidic chip using a thermal inkjet pump, said microfluidic chip comprising:
      an inflexible material having an elastic modulus of 0.1 GPa to 450 GPa,
      a microfluidic channel formed within the inflexible material, said microfluidic channel connecting an inlet and an outlet,
      a working electrode associated with the microfluidic channel having a surface area of 1 µm² to 60,000 µm² within the microfluidic channel, and
      a bubble support structure formed within the microfluidic channel selected from a recess formed in a wall of the microfluidic channel, a protusion formed along a wall of the microfluidic channel, a plurality of support surfaces formed within the microfluidic channel, or a combination thereof, wherein the working electrode is positioned to electrolytically generate a bubble which becomes associated with the bubble support structure; and
   applying a voltage to the working electrode to electrolytically generate a bubble from the aqueous fluid of sufficient size to separate liquid within the microfluidic channel into a plurality of volumes, wherein the bubble support structure retains the bubble at the bubble support structure to form a bubble valve operable to block and unblock the microfluidic channel.

10. The method of claim 9, wherein the working electrode includes gold.

11. The method of claim 10, wherein the working electrode is gold.

12. The method of claim 9, wherein the bubble is expandable and contractible to form a bubble valve for blocking and unblocking the microfluidic channel, respectively.

13. A microfluidic chip system, comprising:
   a microfluidic chip, comprising:
      an inflexible material having an elastic modulus of 0.1 GPa to 450 GPa,
      a microfluidic channel formed within the inflexible material, said microfluidic channel connecting an inlet and an outlet;
      a working electrode associated with the microfluidic channel having a surface area of 1 µm² to 60,000 µm² within the microfluidic channel, wherein the working electrode includes gold; and
      a bubble support structure selected from a recess formed in a wall of the microfluidic channel, a protusion formed along a wall of the microfluidic channel, a plurality of support surfaces formed within the microfluidic channel, or a combination thereof, wherein the working electrode is positioned and configured to electrolytically generate a bubble formed of an aqueous fluid where the bubble becomes associated with the bubble support structure to form a bubble valve operable to block and unblock the microfluidic channel; and
   a power supply operatively associated with the working electrode.

14. The system of claim 13, wherein the power supply is a direct current (DC) power supply.

15. The system of claim 13, wherein the system is operatively associated with a heater.

16. The system of claim 13, wherein the system is operatively associated with a sensor.

17. The system of claim 13, wherein the working electrode is gold.

* * * * *